(12) United States Patent
Jura (10) Patent No.: US 6,326,408 B1
(45) Date of Patent: Dec. 4, 2001

(54) TRANSFORMATION OF EXPANDED POLYMERS

(75) Inventor: Patrick Jura, Haramont (FR)

(73) Assignee: Financiere Lea S.A.R.L., Saint-Omer (FR)

( * ) Notice: Subject to any disclaimer, the term of this patent is extended or adjusted under 35 U.S.C. 154(b) by 0 days.

(21) Appl. No.: 09/485,151

(22) PCT Filed: Jul. 31, 1998

(86) PCT No.: PCT/FR98/01715

§ 371 Date: Feb. 4, 2000

§ 102(e) Date: Feb. 4, 2000

(87) PCT Pub. No.: WO99/07776

PCT Pub. Date: Feb. 18, 1999

(30) Foreign Application Priority Data

Aug. 4, 1997 (FR) .................................................. 97 09966

(51) Int. Cl.⁷ ....................................................... C08J 11/04
(52) U.S. Cl. ............................................... 521/47; 521/146

(58) Field of Search ......................................... 521/47, 146

(56) References Cited

U.S. PATENT DOCUMENTS

| | | | | |
|---|---|---|---|---|
| 5,859,072 | * | 1/1999 | Emori | 521/47 |
| 5,891,403 | * | 4/1999 | Badger | 521/47 |
| 5,922,835 | * | 7/1999 | Van Den Wittenboer | 521/47 |

* cited by examiner

*Primary Examiner*—Morton Foelak
(74) *Attorney, Agent, or Firm*—Browdy and Neimark (57) ABSTRACT

The invention concerns the transformation of expanded polymers, in particular styrene polymers of the polystyrene type and styrene copolymers. More particularly it concerns a method for transforming polymers in an expanded solid state into a non-expanded amorphous state in the form of a re-usable malleable pasty magma. The method comprises a step for treating the polymer with a transforming solution containing a solvent, a non-fatty lubricant and optionally an alcohol. The invention concerns the transformation method proper, the transforming solution used in said method, the device for implementing said method and the magma resulting from implementing the method.

22 Claims, 11 Drawing Sheets

SECTION A.A.

TRANSFORMATION OF EXPANDED POLYMERS

CROSS REFERENCE TO RELATED APPLICATION

The present application is the national stage under 35 U.S.C. 371 of PCT/FR98/01715, filed Jul. 31, 1998.

The present invention relates to a process for the conversion of polymers, preferably expanded polymers such as expanded polystyrene. More particularly, the present invention relates to a process for the conversion of polymers from an expanded solid state to a non-expanded amorphous state in the form of a reusable, pliable, pasty intermediate magma. The invention relates to the conversion process proper, the conversion solution used in said process, the device for carrying out the process of the invention, and to the magma obtained after carrying out said process, and articles produced from said magma.

The use of expanded polymers of the polystyrene type is very widespread. This use, although very beneficial in view of the low cost and the great ease of handling of expanded polystyrene (EPS), has resulted in the generation of considerable amounts of EPS wastes which are difficult to recycle.

Until now, two solutions have been put forward to enable industries as varied as the agro-food industry, the construction industry and, more generally, the handling industry, to dispose of their EPS wastes: either the destruction or the recycling of EPS.

The destruction of EPS is carried out by incineration at high temperatures. Apart from the high costs associated with the construction and operation of the incineration plants, the destruction of EPS gives rise to the dissemination of toxic substances into the atmosphere.

With regard to EPS recycling, the methods currently available generally propose grinding used packaging made of expanded polystyrene and reintroducing it into the production process. This type of process is attractive but has some major disadvantages.

Amongst others, the cleanness of the EPS packaging to be recycled is a vital condition if it is to undergo appropriate recycling. Moreover, recycling EPS implies the grinding and appropriate granulation thereof. These steps make effective EPS recycling very complicated.

The present invention provides firstly, therefore, a process for the conversion of polymers without risk to man and the environment which enables this type of waste to be upgraded in an effective and profitable manner.

The process is simple, effective and inexpensive and, unlike the current recycling processes, does not necessarily presuppose that the wastes to be recycled be very clean. The process of the invention makes it possible to obtain a pasty semi-finished material which can then be used by all the conventional processes of injection, extrusion or moulding in the plastics industry. This material may also be used to produce various articles, particularly insulation or joining articles. The consistency of the material obtained once solidified is similar to that of a plastic resin.

The present invention relates, therefore, to a process for the conversion of a polymer, essentially an expanded polymer, characterised in that:

said polymer is treated with a conversion solution comprising:
  a major proportion of a solvent making it possible to modify the physical state of said polymer from an expanded solid state to a non-expanded amorphous state such as to obtain a pliable, pasty intermediate magma,
  a minor proportion of a non-greasy lubricant in a sufficient amount to give said magma a non-sticky surface state and, if necessary,
  a minor proportion of an alcohol in a sufficient amount to bind said solvent and said lubricant in said solution,
said magma is recovered and, if necessary,
all or part of said solvent is evaporated.

The present invention will now be described in more detail and, for a better understanding of certain preferred embodiments, it will be necessary to refer to the attached figures in which:

FIG. 3b represents a top view of the device of FIG. 2a;

FIG. 4b represents a transverse section of a treatment vessel according to line AA of FIG. 4a;

The process according to the invention makes it possible to obtain a magma of uniform and homogeneous consistency. The consistency of the material obtained once this magma has solidified is similar to a plastic resin.

The magma obtained after treatment of the polymer by the process of the invention is the result in particular of a change in the expanded polymer to a polymer having a structure and consistency similar to a conventional pasty resin. It is a pliable, pasty magma containing small amounts of solvent which allow its pasty consistency to be retained until drying.

Without wishing to be bound to a particular theory, it seems that the conversion of polymers, particularly polymers of the EPS type to a pliable, pasty magma is the result of internal pressure effects exerted on the polymer by the conversion solution yet without modifying the chemical bonds between the monomers forming said polymers and, probably, without there being any major interactions with the polymer itself in terms of its structure. The conversion solution, during its reaction with the polymer, makes it possible to obtain a collapse of the internal structure of the latter by replacing air molecules trapped in its structure by small amounts of solvent. The magma thus obtained may retain its pliable, pasty character over a long period of time, generally more than two years. To this end, it is sufficient that the magma be kept in a small amount of solvent and preferably away from air.

The invention relates in particular to the recycling of expanded polymers of the EPS type.

Unlike the known processes, it is not absolutely necessary for the expanded polymer to be recycled to be free from impurities. As described in more detail below, it will be possible to adjust the operating parameters of the process according to the type of polymer to be converted.

It should be noted that although the polymer whose recycling is primarily envisaged is EPS, other types of polymers, expanded or otherwise, may be converted by carrying out the process of the invention. Styrene copolymers may be mentioned in this connection.

Although it is preferable to grind the elements of polymer to be recycled before bringing them into contact with the conversion solution, grinding is not absolutely necessary. In fact, the time required for the polymer treated to collapse will depend rather on the diameter of the particles, generally beads, forming its structure. The greater this diameter, the greater the air content of the polymer and the more rapid its reaction to the treatment and hence the more rapid its collapse.

If particularly clean EPS wastes in a small volume are used, it is not necessary to grind the polymer to be recycled.

Depending on its origin, it may be useful substantially to remove water from the polymer before bringing it into contact with the conversion solution. It has been observed, in fact, that the presence of water might cause a dry product to be obtained instead of a pliable, pasty magma. Water may be removed by any conventional method, for example using a stream of air at ambient temperature or hot air.

The conversion solution used in the process of the invention comprises, as solvent, a compound such as acetone. Such a compound is particularly preferred within the context of the invention. However, other products such as certain higher alcohols, benzene, chloroform or methylene chloride, tetrachloroethylene, carbon tetrachloride, toluene or trichloroethylene may be envisaged in so far as the basic structure of the polymer to be treated is kept intact.

Some of the solvents listed above may prove to be too aggressive for the polymer in high concentrations. In that case they may lead to a deterioration in the basic structure of the polymer. Tests relating to the concentration to be used and the type of solvent that may be used may be carried out easily by the skilled person.

The proportion of solvent in the conversion solution used for carrying out the process of the invention will generally be very high in relation to the other constituents of the solution. The skilled person may choose the appropriate proportions but these proportions should preferably be between 90% and 99% by volume of the conversion solution. In the case of acetone which has proved to be the most attractive solvent hitherto, the proportions of this solvent in the conversion solution generally range from 94% to 98% by volume of the conversion solution, with a preferred percentage around 97%.

The lubricant is the second important constituent of the conversion solution used in carrying out the process of the invention. The proportion of lubricant must be chosen such as to obtain a pasty magma having a non-sticky surface state and thus giving said magma wetting properties. In the absence of such a lubricant, a resin having a crazed surface state once the solvent has evaporated is obtained in most cases. Thus, the lubricant according to the invention makes it possible to control the surface tension during drying, this being responsible for fissures. Moreover, the lubricant generally makes the pasty magma much easier to handle.

The type of lubricant which may be used in carrying out the process of the present invention may be chosen without difficulty by the skilled person, in the knowledge, however, that it should preferably be a non-greasy lubricant. Glycerol is a lubricant of choice but other non-greasy lubricants such as polytetrafluoroethylenes, particularly those sold under the Teflon® brand, may also be considered.

The proportion of lubricant in the conversion solution of the invention is relatively small compared with that of the solvent. The proportion generally ranges from 1% to 10% by volume and preferably from 1% to 3% by volume.

Until now, glycerol has proved to be the most attractive non-greasy lubricant. It is generally used in proportions ranging from 1% to 2% by volume of the conversion solution. In a preferred embodiment of the invention, the percentage of glycerol is around 1.7%.

The incorporation of an alcohol in a small amount in the conversion solution of the invention is optional although desirable. The role of this alcohol is to bind the two other constituents of the solution in order to reduce as much as possible the internal phenomena of dissociation of the magma obtained.

The choice of suitable alcohol may also be made by the skilled person. The alcohol used is preferably an ethyl alcohol 95°, more preferably ethyl alcohol although other linear or branched alcohols having between 1 and 15 carbon atoms may also be used.

The proportions of alcohol in the conversion solution of the present invention are small. They generally range from 1% to 6% by volume of the conversion solution and preferably from 1% to 2% by volume. In a preferred embodiment of the invention using ethyl alcohol 95°, the preferred percentage of this alcohol is around 1.3% by volume.

It is important to note here that the concentrations of alcohol and lubricant directly influence the final fluidity of the pasty magma obtained. In this regard, a reduction in the concentrations of alcohol and lubricant in favour of the solvent increase the fluidity of the magma obtained. For example, a conversion solution containing 96% of acetone makes it possible to obtain a more solid intermediate magma whereas a conversion solution containing 96.5% of acetone makes it possible to obtain a much more fluid magma The skilled person may thus vary the concentrations of the various constituents of the conversion solution depending on the final consistency required for the pasty magma.

According to another aspect of the invention, it also relates to the conversion solution described above and to its use for the conversion of polymers from an expanded solid state to a non-expanded amorphous state in order to obtain a pliable, pasty magma.

The present invention also relates to a device for the conversion, by way of a conversion solution, of polymers, particularly expanded styrene polymers of the expanded polystyrene type and styrene copolymers, from an expanded solid state to a non-expanded amorphous state in order to obtain a pliable, pasty magma. Said device is characterised in that it comprises a treatment vessel capable of receiving the polymer to be converted, and suitable means of introducing the conversion solution into the treatment vessel such as to permit contact between the polymer and the conversion solution in order to confer a non-expanded amorphous state on the polymer. The device also comprises, if necessary, means of removing the magma and means of filtration to permit the removal of impurities therefrom.

More particularly, the device is composed of a vessel comprising:

an entry port for the polymer before treatment;

an outlet port for the polymer after treatment; and a series of nozzles arranged on the internal periphery of the vessel and allowing the conversion solution to be sprayed onto the polymer passing through said vessel.

The means of removing the paste are more particularly composed of an endless screw mechanism arranged downstream of the treatment vessel. The means of filtration are generally composed of a hopper situated downstream of the means of removal.

The device of the present invention may also comprise means of storing and grinding the polymer before treatment by the treatment solution.

Figure 1:
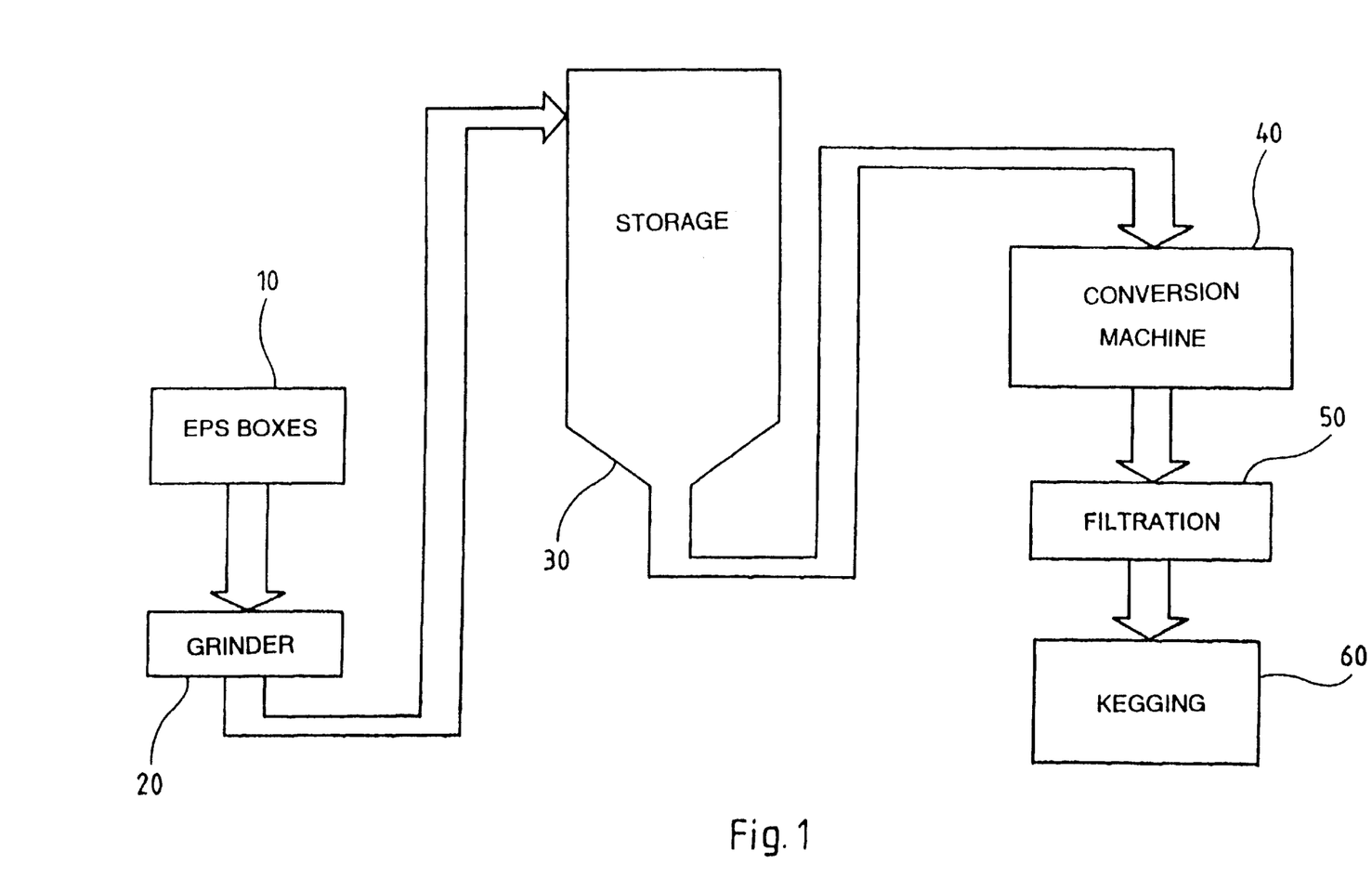
FIG. 1 represents a diagram illustrating the steps of an embodiment of the process of the present invention.

FIG. 1 illustrates the steps for carrying out the process of the present invention. As illustrated by way of example, EPS boxes 10 first undergo a grinding step 20. The granules thus obtained are stored in a suitable silo 30. The granules are then converted in the conversion device 40 either by immersion in a conversion solution or by spraying said solution. Said conversion is followed by filtration of the impurities 50 and kegging 60 of the amorphous magma thus obtained.

1) Grinding the Polymer

As mentioned above, the step of grinding the polymer prior to its use in carrying out the process of the invention is not absolutely necessary, particularly if the polymer to be recycled contains little or no contamination by impurities.

However, if the process of the invention involves spraying the conversion solution onto the polymer to be recycled, it is preferable to grind the latter beforehand.

The diameter of the polymer beads and particularly of ground EPS may be adjusted without difficulty by the skilled person such that the spraying of the conversion solution permits the rapid change from an expanded solid state to a non-expanded amorphous state of the polymer to be treated.

2) Application of the Conversion Solution a. Immersion

If the polymer to be recycled is clean or exhibits little contamination by impurities, it is recommended that the process of the invention be carried out by immersing the polymer to be treated in the conversion solution. It is preferable not to immerse moist polymer in a bath of conversion solution because the water contained in the polymer would rapidly reduce the conversion capacity of the solution, and the time required for it to change from an expanded solid state to a non-expanded amorphous state would increase rapidly after successive treatments.

However, immersion of the polymer of the EPS type in a tank containing the conversion solution may prove useful if small amounts of polymer are to be converted. In this type of operation, the minimum amount of conversion solution to be used is 1 l per kilogram of polymer to be treated. The optimum amount of conversion solution to be used ranges from 1.5 l to 2 l per kg of polymer to be treated.

b. Spraying

Spraying is preferred because it allows large amounts of polymer to be treated more rapidly using minimal amounts of conversion solution.

Spraying involves spraying the most exact amount possible of solution which is metered as a function of the amount of polymer to be treated, which makes it possible to prevent the accumulation of water or impurities in the solvent.

The optimum amount of conversion solution to be used may generally be assessed according to the following equations:

$$M = Q + S$$

$$(Q \times 0.75) + Q = M$$

where Q is the amount of polymer to be treated (in kg); S is the conversion solution (in kg); and M is the amount of magma obtained (in kg).

In other words, one kilo of EPS treated using 0.75 kg of conversion solution will allow 1.75 kg of pasty magma to be obtained.

3) Filtration of the Magma

The magma obtained is generally filtered so as to remove the majority of its impurities. Normally, the consistency of the magma obtained is such that it is possible to pass it through a hopper without too much difficulty. The diameter of said hopper will depend on the amount and nature of the impurities present in the polymer and on the consistency of the magma obtained. The diameter of the hopper and the average pressure applied during filtration may be adjusted without difficulty by the skilled person.

4) Other Parameters

The process of the present invention may be carried out entirely at ambient temperature. If the acetone, glycerol and ethyl alcohol form the constituents of the conversion solution, it is possible to handle the paste with bare hands without risk. It is also possible to obtain a self-coloured magma, if necessary.

Once the magma has been obtained at ambient temperature, the solidification time of the articles moulded or extruded from this magma is about 48 h. The magma may, however, be kept in this amorphous state for a very long period of time by immersing it in a small amount of the conversion solution.

It is, of course, possible to reduce the solidification time of the articles moulded or extruded from the magma to a few seconds by curing said articles. Additional details concerning the conversion of the magma to finished articles will be provided below.

1) Conversion by Immersion

Figures 2A, 2B:
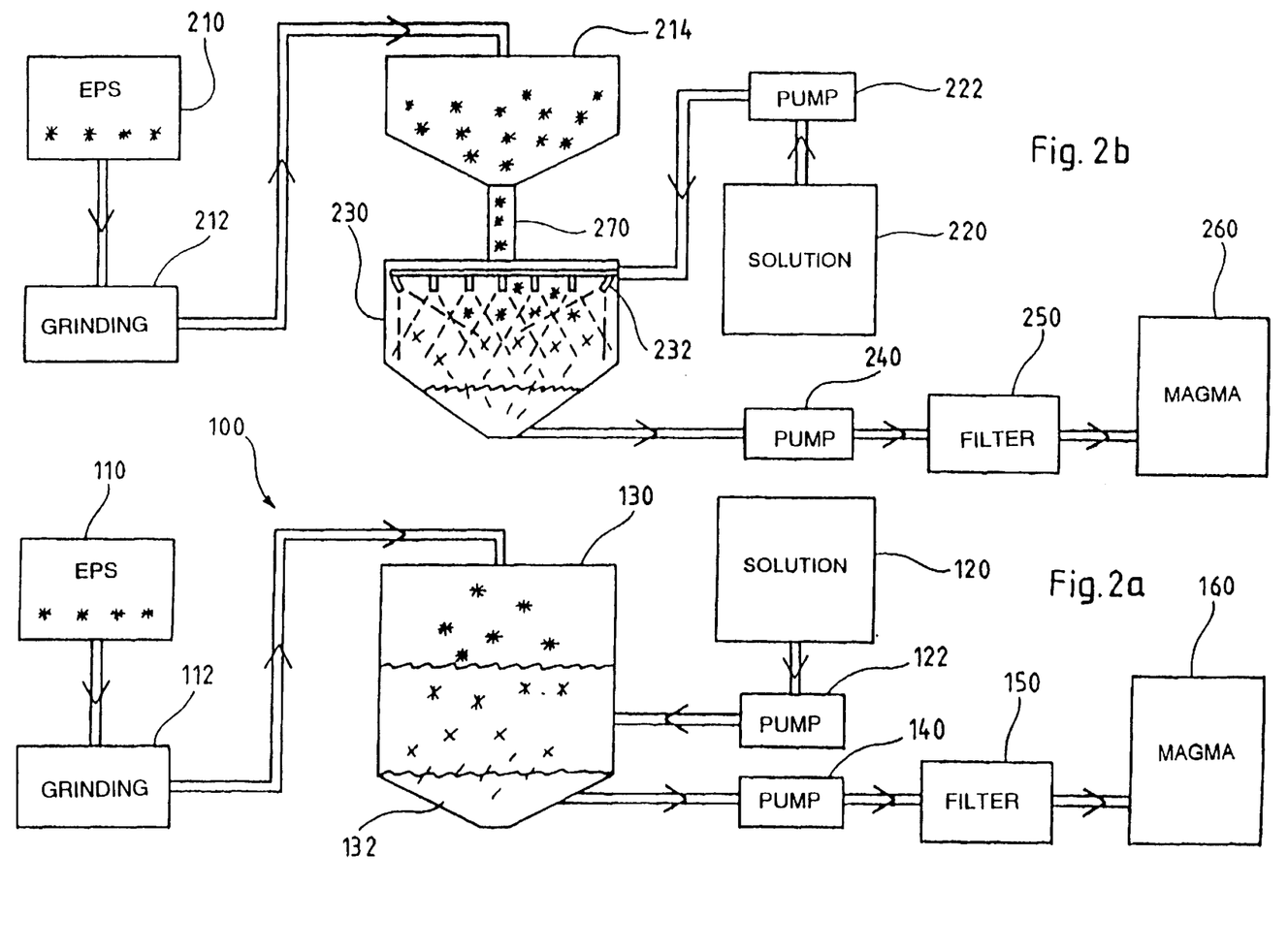
FIG. 2a is a schematic representation of an embodiment of a device for conversion by immersion according to the present invention.
FIG. 2b is a schematic representation of an embodiment of a device for conversion by spraying according to the present invention.

The device for conversion by immersion is illustrated schematically in FIG. 2a. This device, represented in a general manner by reference number 100, comprises, in a preferred embodiment thereof, a first storage tank 110 for EPS connected to a grinder 112, itself connected to a treatment vessel 130. A second storage tank 120 for the conversion solution is connected to a pump 122 making it possible to feed the treatment vessel 130. This treatment vessel 130 is also connected to a pump 140 connected to a filter 150 and to a storage vessel 160 for the magma.

If the device for conversion by immersion 100 is used, a predetermined amount of conversion solution is pumped into the treatment vessel 130 by way of pump 122. The EPS is then placed in the treatment vessel 130 such as to be immersed in the conversion solution. The magma 132 is deposited on the bottom of the treatment vessel 130 and is then pumped by pump 140 through the filter 150 to the recovery vessel 160.

2) Conversion by spraying

A schematic representation of a first embodiment of a device for conversion by spraying, illustrated in general manner by reference number 200, is shown in FIG. 2b. This device comprises a first storage tank 210 for EPS connected to a grinder 212, itself connected to a second storage tank 214 connected directly to a treatment vessel 230. The device 200 also comprises a storage tank 220 for the conversion solution connected to a pump 222. The pump 222 is connected to a treatment vessel 230 and more particularly to a series of atomisers 232 arranged on the periphery of the treatment vessel 230. The treatment vessel 230 is connected to a pump 240, itself connected to a filter 250, connected to a storage tank 260 for the magma.

If the treatment of a polymer of the EPS type is carried out by way of the device for conversion by spraying 200, the pump 222 is actuated in order to form, by way of the atomisers 232, a fine drizzle of the conversion solution inside the treatment vessel 230. The EPS 270 is then deposited by gravity in the treatment vessel 230. The skilled person will easily be able to adjust the rate at which the EPS will be deposited in the treatment vessel 230 as a function of the height of said vessel and the rate of spraying of the conversion solution.

Once the magma 232 has been deposited on the bottom of the treatment vessel 230, the pump 240 enables it to be passed through filter 250 then to be stored in drums 260 which may be hermetically sealed.

Figure 3A:
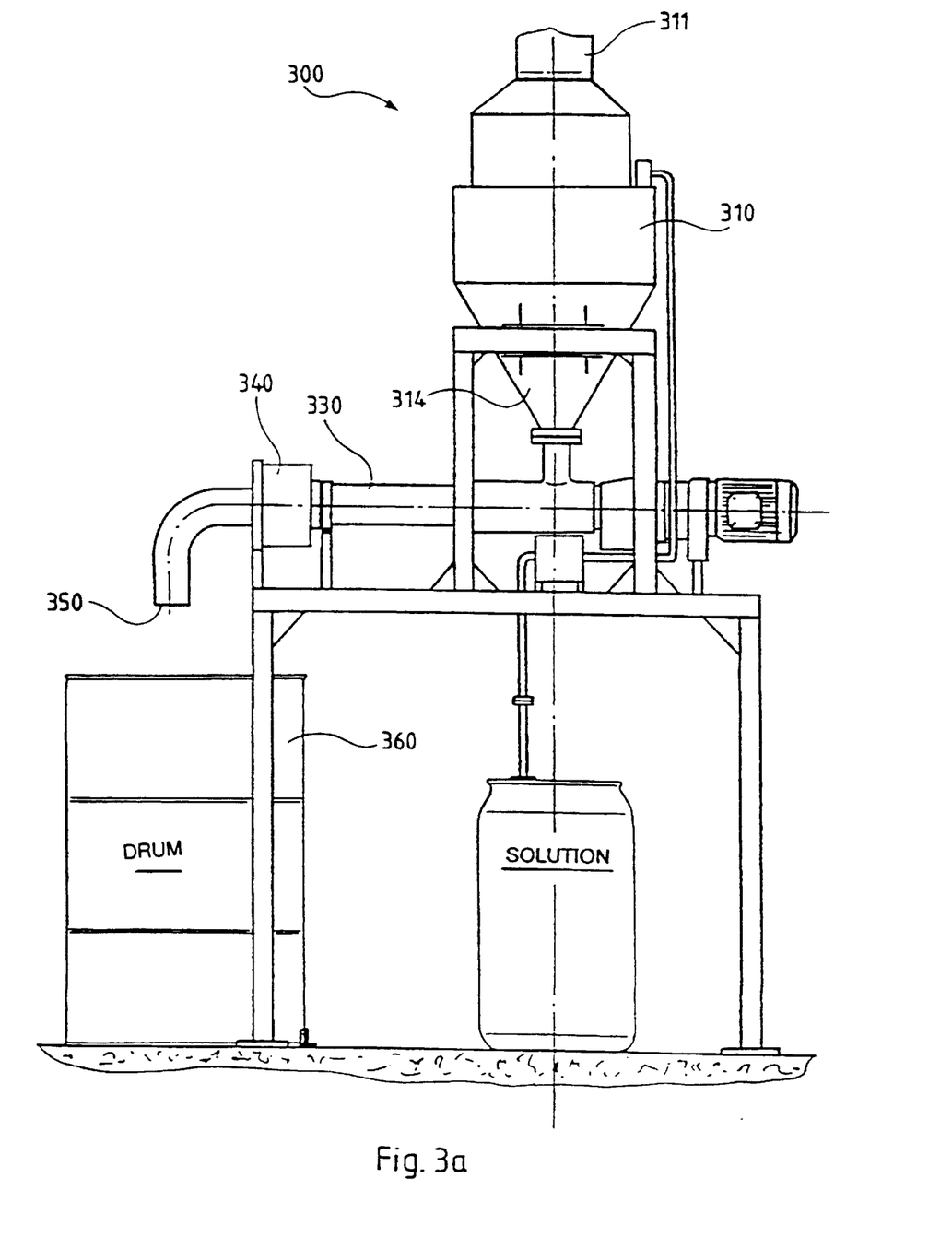
FIG. 3a represents a side view of the main elements of the device for conversion according to the invention.

Another embodiment of the device for conversion by spraying is illustrated in FIGS. 3a, 3b, 4a and 4b. With reference now to FIG. 3a, the device for conversion by spraying, illustrated in a general manner by reference number 300, comprises a treatment vessel 310 the upper part of which comprises an opening 311 allowing the introduction of the EPS to be treated. The treatment vessel 310 is connected in its lower part 314 to means of removal 330 for the magma. These means of removal 330 are connected to a filter 340, itself connected to an outlet port 350 for the magma. A drum 360 allows the magma to be received after treatment.

Figure 3B:
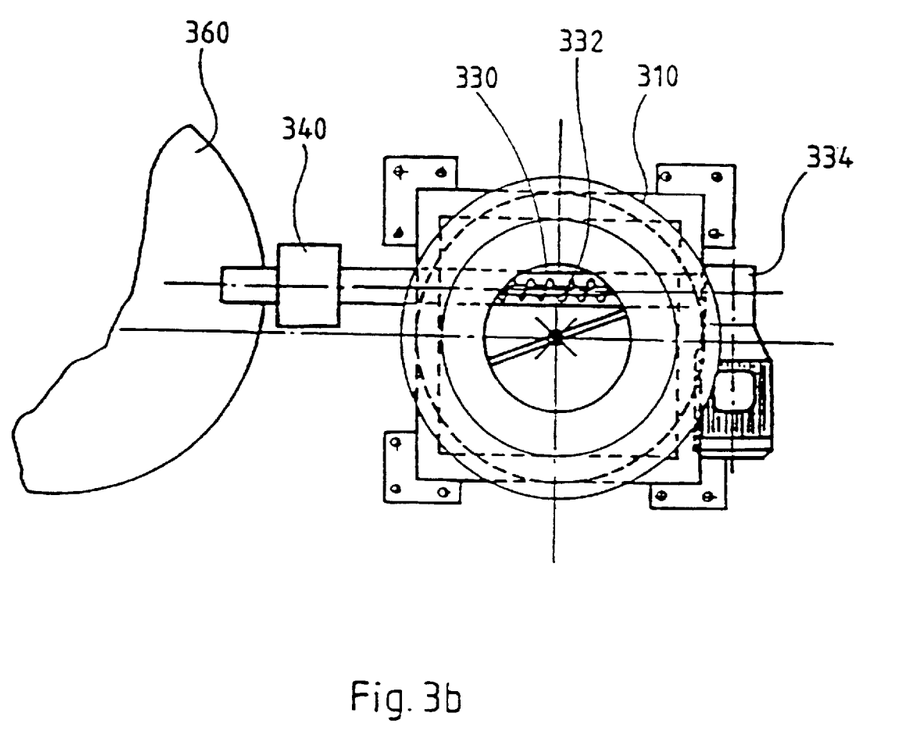

With reference now to FIG. 3b, the means of removal 330 for the magma are composed preferably of an endless screw 332 actuated by a motor 334. This endless screw 332 allows the magma to be removed through filter 340 to drum 360.

In a preferred manner and as illustrated in FIG. 3b, the treatment vessel 310 is circular. The treatment vessel 310 and the means of removal 330 are preferably produced from smooth pieces making it possible to prevent as far as possible the magma sticking either to the wall of the treatment vessel 310 or to the endless screw 332 of the means of removal 330. It is preferable to use stainless steel alloys, particularly alloys of the Inox 304 L type.

Figure 4A:
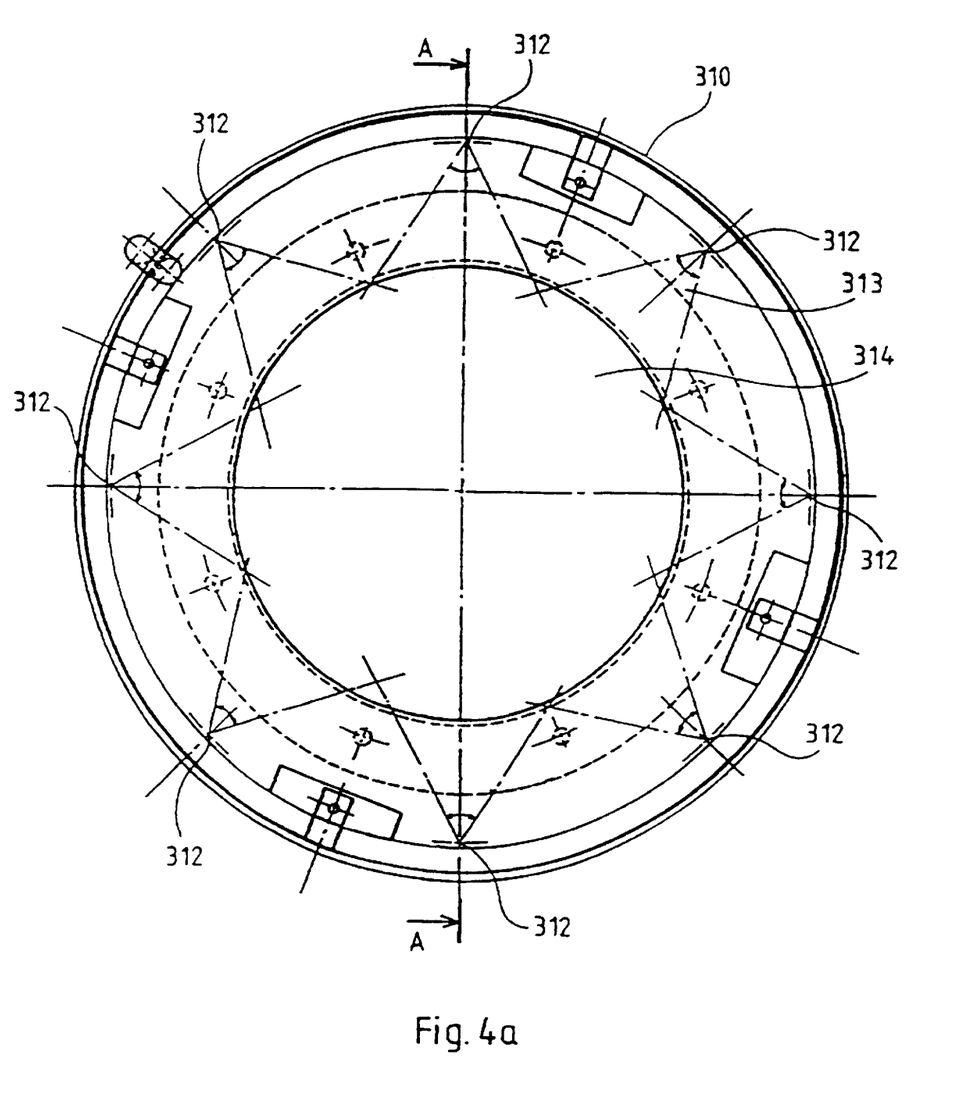
FIG. 4a represents a top view of a preferred embodiment of a treatment vessel of the conversion device of the present invention.

The treatment vessel 310 is illustrated in a more detailed manner in FIG. 4a which represents a top view of said vessel. The vessel 310 comprises, arranged on the periphery of its internal wall, a series of spray nozzles 312. Said spray nozzles 312 have a spray angle 313 with a sufficiently large range to bring about spraying of the conversion solution over the entire surface of the vessel 310 such as to obtain an atmosphere highly charged with conversion solution and to allow homogeneous vaporisation over the EPS falling into the treatment vessel 310.

Figure 4B:
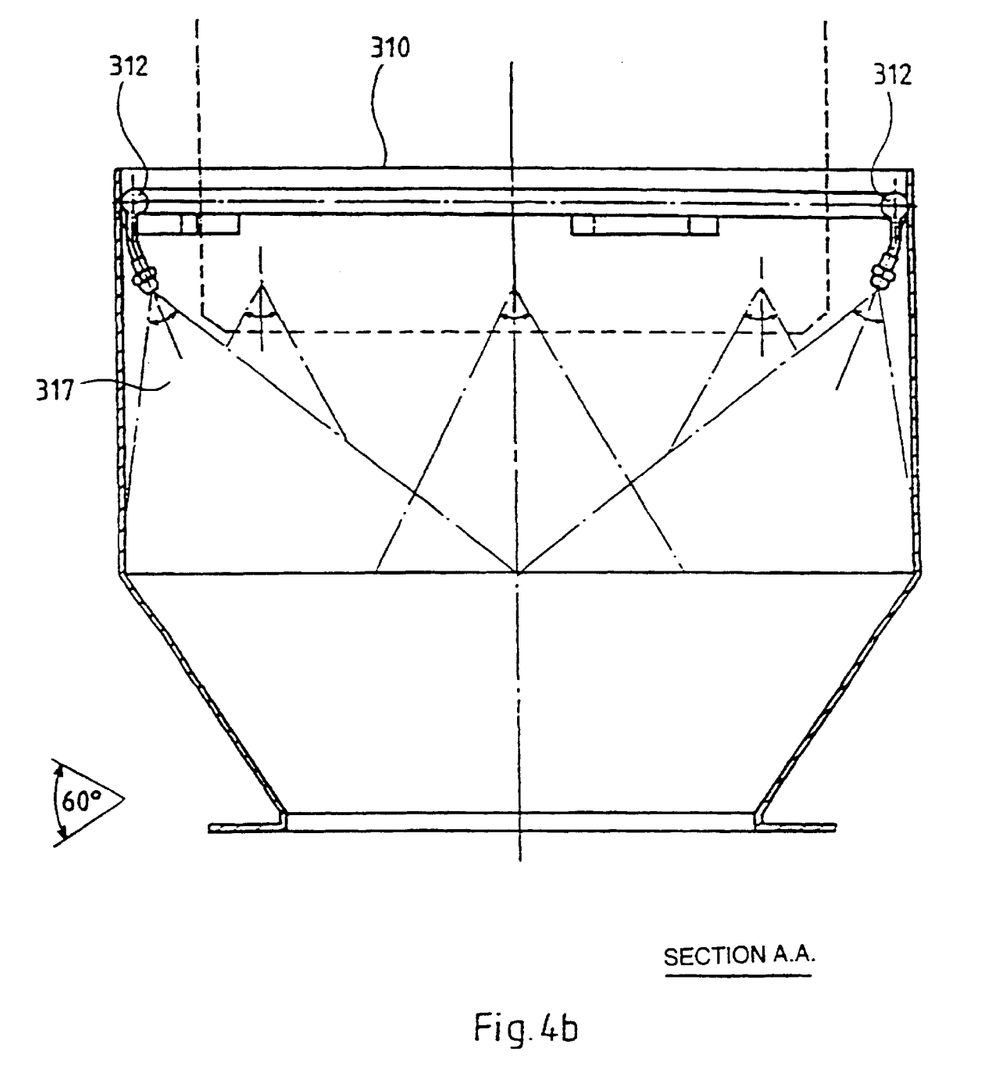

As illustrated in FIG. 4b, the spray angle 317 of the spray nozzles 312 is provided such that spraying takes place homogeneously over the entire interior surface of vessel 310. The spray nozzles are preferably directed towards the lower part of vessel 310. The aim of this is to prevent the formation of magma on the nozzles 312. The spray angles of the spray nozzles 312 are generally about 60° and may be adjusted by the skilled person depending on the volume of the treatment vessel 310.

With reference again to FIG. 3a, if the process of the invention is carried out using the device for conversion by spraying 300, the EPS to be converted is placed in the treatment vessel 310 through the opening 311 after the nozzles 312 illustrated in FIGS. 4a and 4b have been actuated such as to spray the treatment solution over the EPS.

The magma deposited on the bottom of the treatment vessel 310 is removed by the endless screw 332 illustrated in FIG. 3b. Small amounts of EPS may also react with the conversion solution during this treatment step. The magma obtained is then passed through the filter 340 and deposited in the storage drum 360 where residual amounts of untreated EPS may also react.

With reference again to FIG. 3a, the opening 311 which allows the introduction of the EPS to be treated into the treatment vessel 310 may also comprise a mechanical feed system for calibrating the volume of polymer to be treated. This feed system is illustrated in FIGS. 5a and 5b.

Figure 5A:
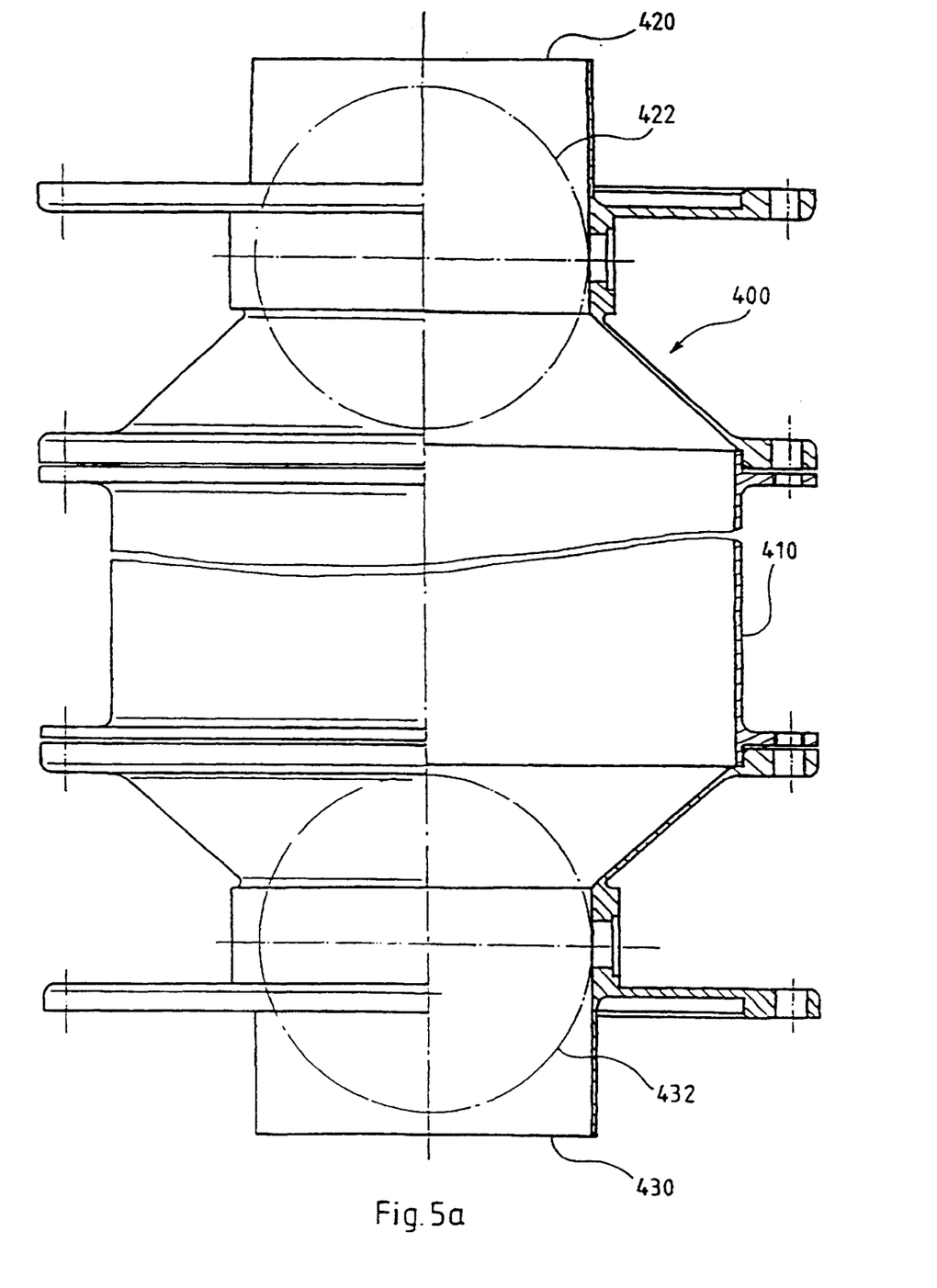
FIG. 5a is a schematic representation of a feed system for the untreated polymer.

FIG. 5a illustrates the main elements of the feed system which is represented in a general manner by reference number 400. The feed system 400 is composed of a receiving vessel for the polymer 410 comprising a feed port 420 for the polymer to be treated and an outlet port 430 for the polymer to the treatment vessel in which the process of the invention will be carried out.

The feed port 420 comprises a first means of closure illustrated in the form of a first feed valve 422 actuated by a motor (not illustrated). The outlet port 430 comprises a second means of closure illustrated in the form of a second feed valve 432, also actuated by a motor (not illustrated).

Figure 5B:
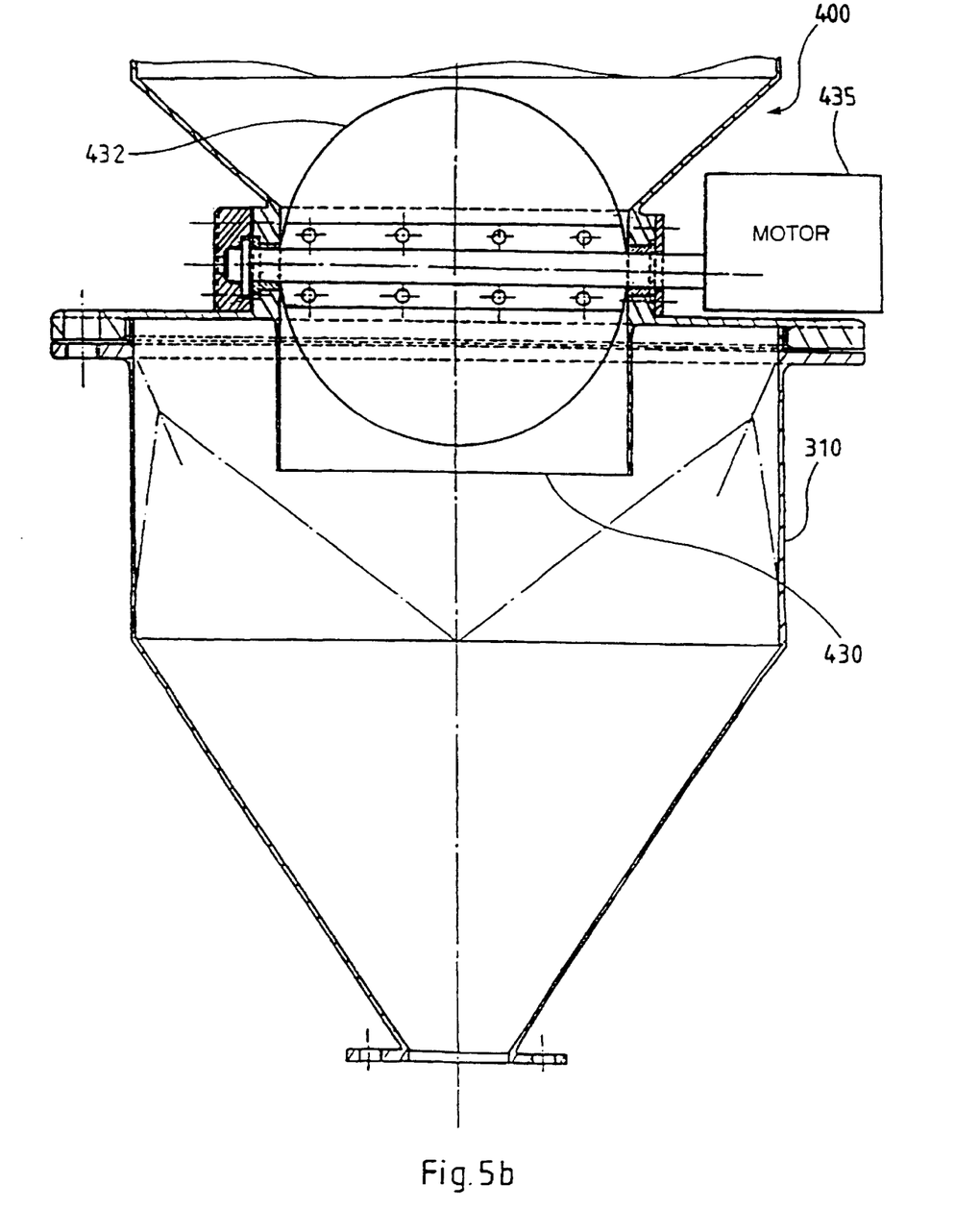
FIG. 5b represents a transverse section of a treatment vessel connected to a feed system for the untreated polymer.

FIG. 5b illustrates the position of the lower part of the feed system 400 on the treatment vessel 310. The second feed valve 432 is connected to a motor 434 allowing said valve to be moved from an open vertical position, as illustrated in FIG. 5b, to a closed horizontal position, the consequence of which would be to close the outlet port 430.

With reference once again to FIG. 5a, if it is desirable to calibrate the volume of polymer to be introduced into the treatment vessel in which the process of the invention will be carried out, the first feed valve 422 is placed in an open position and the second feed valve 432 in a closed position. An amount of polymer may then be introduced into the receiving vessel 410 until the latter is partially or completely filled with the desired amount of polymer. The second feed valve 432 is then placed in an open position, the effect of which will be to cause the polymer to be treated to fall into the appropriate treatment vessel.

It is important to note that, in the feed system illustrated in FIGS. 5a and 5b, the presence of the first feed valve 422 is not absolutely necessary. In fact, the polymer to be treated may be introduced into the receiving vessel 410 with the second feed valve 432 in a closed position without it being absolutely necessary, once the receiving vessel 410 is filled in the desired manner, to close the first feed valve 422 again.

However, the first feed valve 422 may prove very useful in situations where a storage tank for the polymer to be treated is situated immediately above the receiving vessel 410. This first feed valve 422 would then be essential for being able to meter the appropriate amount of polymer to be introduced into the receiving vessel 410.

Figure 6:
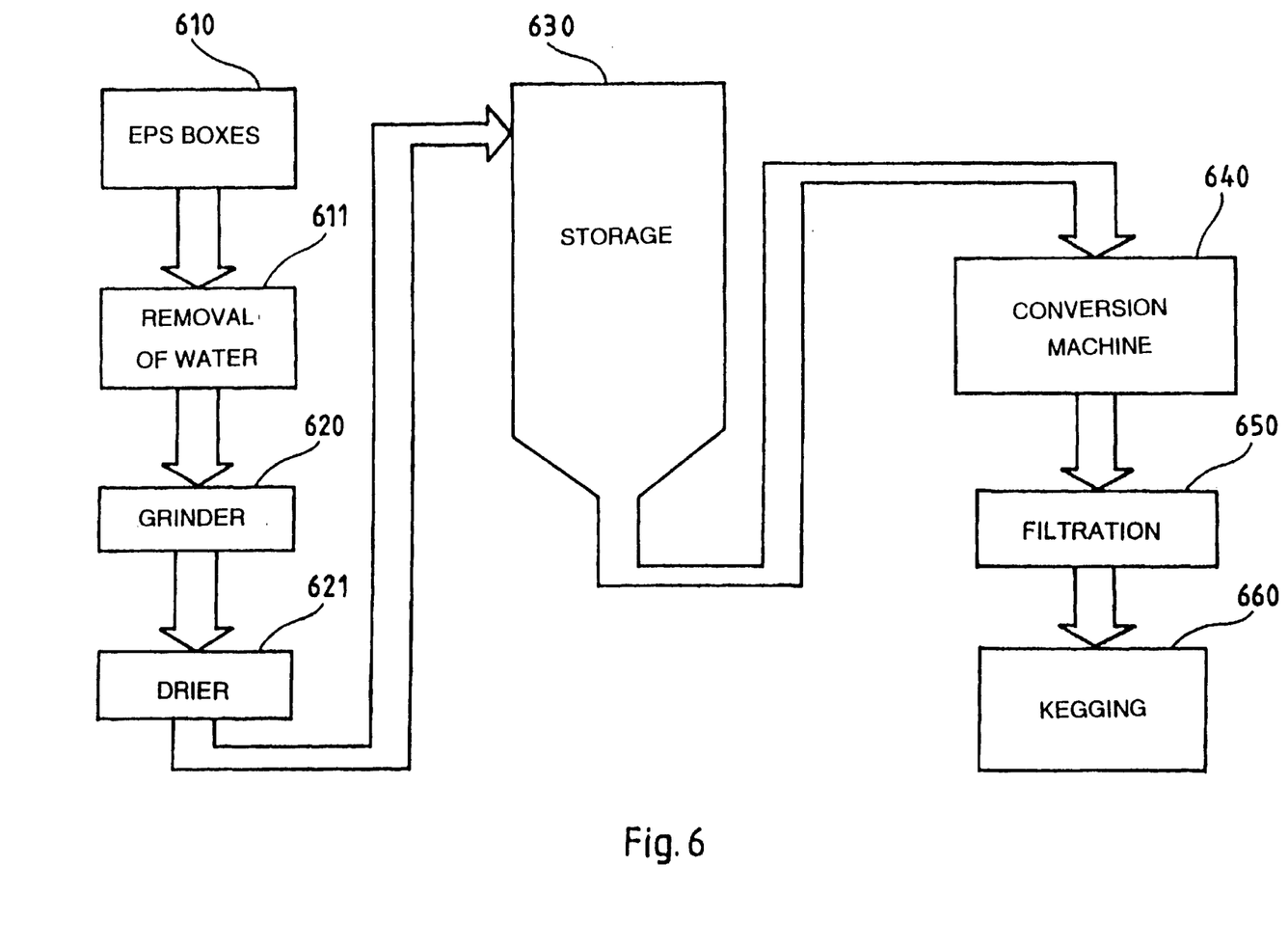
FIG. 6 represents a diagram illustrating the steps of a preferred embodiment of the process of the present invention.

FIG. 6 represents the essential steps that may be carried out for a preferred embodiment of the process of the present invention. As illustrated by way of example, the boxes of EPS 610 undergo a water removal step 611 then undergo a grinding step 620. In this way, granules are obtained which are dried 621 before being conveyed to an appropriate silo 630. The granules are then converted in the conversion device 640 either by immersion in a conversion solution or by spraying with this solution. This conversion is followed by filtration of the impurities 650 and kegging of the amorphous magma thus obtained 660.

Removal of the water consists, if necessary, in expelling the water present on the EPS boxes to be treated. This removal may be carried out in a housing into which the EPS boxes are introduced. The housing may be fitted with strips made of, for example, Teflon, making it possible to facilitate the passage of the EPS boxes. Two to eight nozzles fed by a jet of air may be distributed on each side of this housing. The air may be at ambient temperature and pressurised. The purpose of the drying step following the grinding step is to dry the EPS during its transport from the grinder to the silo. To this end, hot air is pulsed to the outlet of the grinding stage, thus allowing the fragments of EPS to dry completely whilst being transported. The other EPS treatment steps are similar to those described above.

Figure 7:
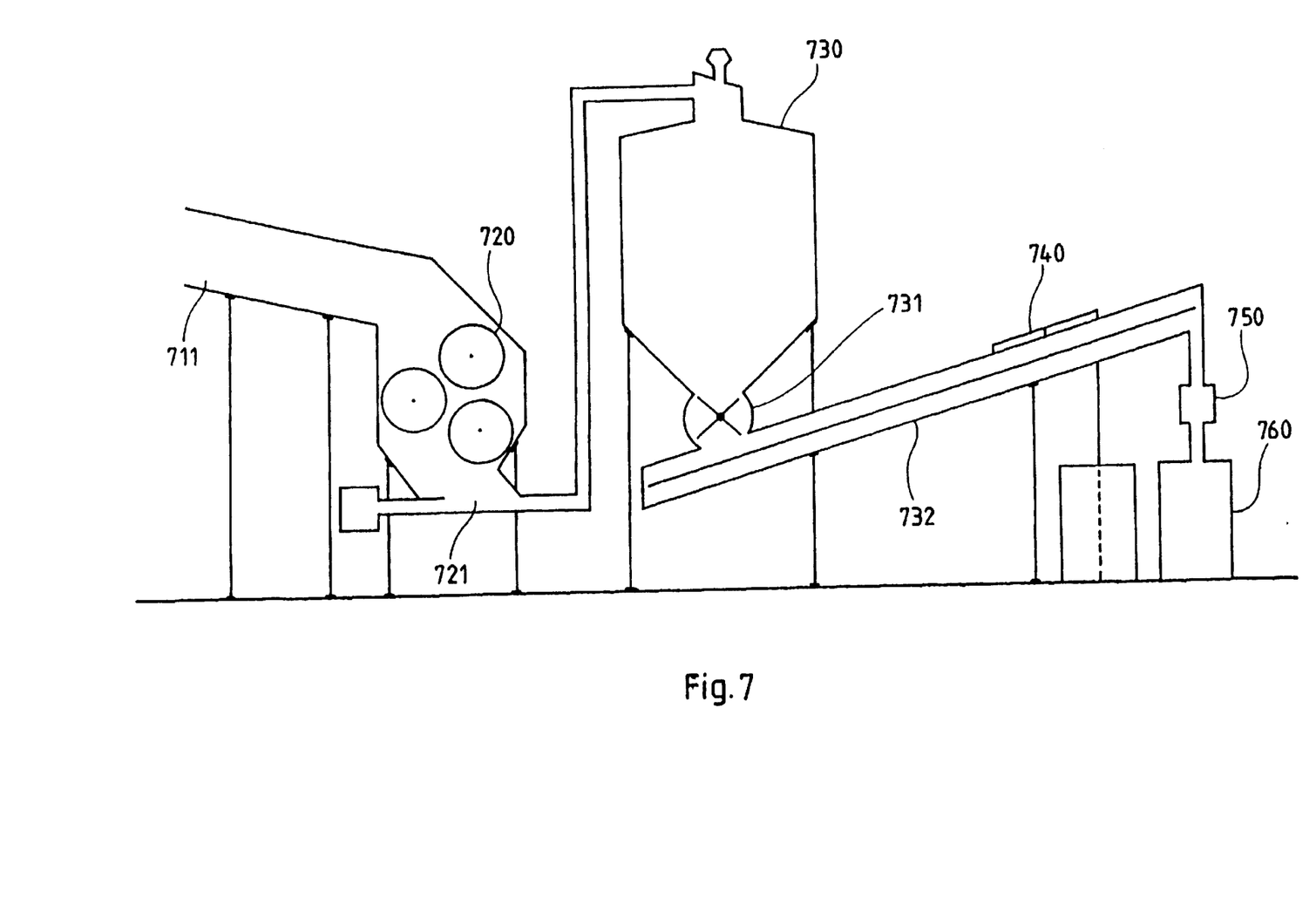
FIG. 7 represents a preferred device for carrying out the process of the invention.

FIG. 7 illustrates a preferred device within the context of the present invention. Said device comprises a system for the removal of water 711 ending at the entrance to the grinder 720. The grinder outlet 720 communicates with the entrance to a drier 721 connected to a storage silo 730. The base of the silo 730 is provided with a material control feeder 731 connected to a conveyor 732. This latter is provided on one part of its length with a spray system 740. The outlet of conveyor 732 is connected to a filtration system 750 the outlet of which communicates with storage drums 760.

The main advantage of this device is to allow the substantial removal of all traces of water from the polymer before its treatment by the conversion solution.

Figure 8:
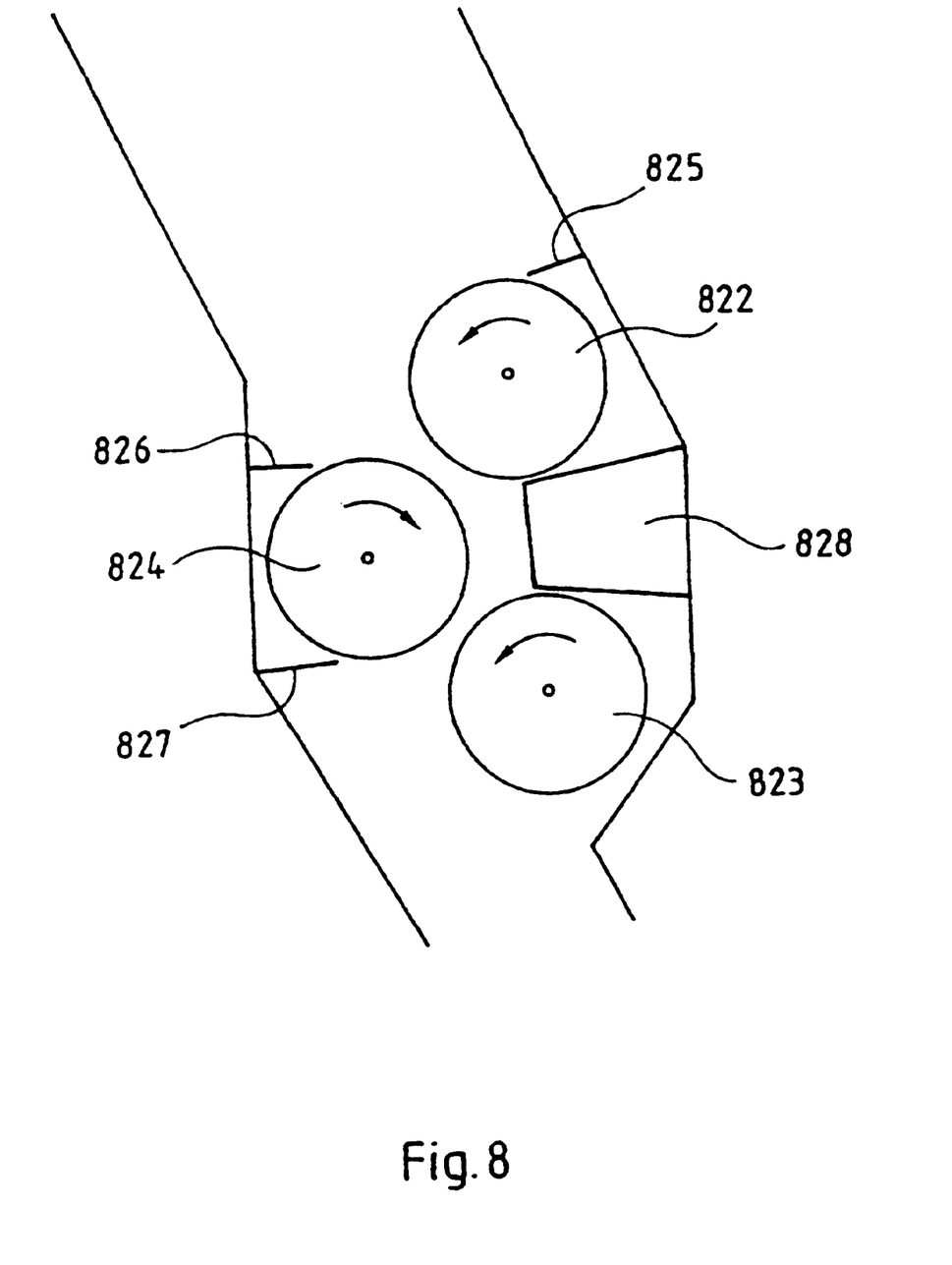
FIG. 8 represents a grinder which may be used in the process of the invention.

FIG. 8 illustrates a grinding device 720 which may be used in particular in the device represented in FIG. 7. This device comprises at least three cylinders 822, 823, 824 arranged in a chicane, and anti-return bars 825, 826, 827, 828. According to a particularly advantageous aspect, each of the cylinders 822, 823 and 824 which make up the grinder has a different speed. Thus, the speed of cylinder 824 may be chosen such as to be equal to about twice that of cylinder 822, whereas the speed of cylinder 823 is approximately equal to three times that of cylinder 822. The device represented in FIG. 7 having a grinder according to FIG. 8 makes it possible to treat more than four hundred EPS boxes per hour, these boxes having a length of 800 millimetres, a width of 400 millimetres and a height of 300 millimetres, or more than 100 $m^3$ of EPS per hour.

The environment in which the evaporation of small amounts of solvent contained in the magma will be carried out will influence to a considerable extent the final structure of the product.

Generally speaking, evaporation of the solvent may be carried out in three ways:
- either by hot pulsed air at ambient pressure;
- or by injection moulding under pressure; or
- by curing under hot conditions with or without the application of pressure.

a. Drying with Hot Pulsed Air

The use of hot pulsed air at the time of drying the magma according to the invention makes it possible to produce a slightly cellular product which may, inter alia, be used easily as an insulating material on smooth surfaces.

For example, the magma may be applied in the undried state to wall surfaces. This application is followed by drying with pulsed hot air which produces a certain expansion of the polymer which will in that case constitute an effective insulation material which is easy to use.

b. Injection Moulding or Natural Drying

These two types of drying make it possible to obtain solid blocks of resin in which the EPS is expanded very little, if at all. Drying by injection allows more rapid solidification than natural drying.

c. Curing without Pressure

Curing the magma of the invention without the application of pressure may also lead to expansion of the polymer.

The potential applications for the magma obtained after carrying out the process of the present invention are numerous and varied.

Examples of application of the paste of the present invention include, amongst others, various industrial or domestic applications which make it possible to obtain finished articles in all forms such as piping, dishes, various boxes and protective housings.

According to another aspect of the invention, it relates to composite articles which may be prepared from the pasty magma described above and at least one third compound. These articles may consist in pasty or liquid products such as adhesives, varnishes, coatings, sealants, paints or lacquers and solid products consisting in particular of panels of agglomerated particles.

An adhesive according to the invention may comprise a mixture of pasty magma with an organic solvent capable of breaking at least part of the chemical bonds between the monomers which make up the polymer. Such an organic solvent may consist, in particular, of trichloroethylene. An adhesive according to the invention generally contains at least 85%, preferably at least 90% by weight of pasty magma. Such an adhesive has a greater adhesive force than adhesives based on neoprene currently on the market.

An adhesive according to the invention may also comprise 1 to 7% of a compound such as xylene. Such a compound makes it possible to obtain a relative flexibility of the adhesive film and a less abrupt rupture point. This adhesive may be obtained simply by mixing these constituents.

It is also possible to prepare a varnish or lacquers based on the pasty magma of the invention. These varnishes also comprise the basic magma, an organic solvent of the trichloroethylene type and oil of turpentine.

The adhesives and varnishes described above may also contain anti-UV agents such as phenyl-2-benzimidazole sulfenic acid.

Other composite articles according to the present invention consist in sealants comprising a pasty magma as described above and plaster particles. Such sealants contained in a sealed vessel may be stored for a long period of time, generally for more than two years. Said sealants may be prepared simply by mixing their components.

The invention also relates to solid composite articles prepared from a pasty magma described above. These articles may be prepared simply by mechanical mixing, for example, by mixing and kneading the pasty magma according to the invention with organic solid particles such as particles of wood, natural fibres, artificial fibres, or non-organic solid particles such as particles of metal, glass, clay powder, stone powder or slate powder. The mixture thus obtained may then be dried and hardened.

Before drying, it is possible to add to the mixture anti-UV agents such as phenyl-2-benzimidazole sulfenic acid. It is also possible to place the mixture before drying in a suitable mould in order to obtain, after drying and hardening, an article of the desired shape. In this way, it is possible to prepare panels of agglomerated materials for various uses. Thus, if the solid particles consist of brick particles, the panel may be used, for example, for facade decoration. Moreover, if the particles are wood particles, the panels may be used in the construction of components of pallets, parquet flooring or furniture.

According to an advantageous aspect of the invention, the panels of agglomerated particles defined above may be assembled by means of the adhesive described above. Finally, said panels may be varnished by means of a varnish such as that mentioned above.

The solid articles according to the invention have good sealing, thermal insulation and acoustic properties.

What is claimed is:

1. A process for the conversion of a polymer consisting of an expanded styrenic polymer or an expanded styrenic copolymer, characterised in that:

said polymer is treated with a conversion solution comprising:
- a major proportion of a solvent making it possible to modify the physical state of said polymer from an expanded solid state to a non-expanded amorphous state such as to obtain a magma,
- a minor proportion of a non-greasy lubricant consisting of glycerine or a polytetrafluoroethylene in a sufficient amount to give said magma a non-sticky surface state and, if necessary,
- a minor proportion of an alcohol in a sufficient amount to bind said solvent and said lubricant in said solution, said magma is recovered and, if necessary, all or part of said solvent is evaporated.

2. A process according to claim 1, characterised in that the polymer is ground before being treated with said conversion solution.

3. A process according to claim 1, characterised in that the polymer is immersed in the conversion solution.

4. A process according to claim 1, characterised in that the conversion solution is sprayed onto the polymer.

5. A process according to claim 1, characterised in that the magma is filtered in order to extract the impurities therefrom.

6. A process according to claim 1, characterised in that the solvent of said conversion solution is chosen from benzene, chloroform, methylene chloride, tetrachloroethylene, carbon tetrachloride, toluene or trichloroethylene.

7. A process according to claim 1, characterised in that the solvent of said conversion solution is acetone.

8. A process according to claim 7, characterised in that the conversion solution comprises from 90% to 99%, preferably from 94% to 98% by volume of solvent.

9. A process according to claim 7, characterized in that the conversion solution comprises from 94% to 98% by volume of solvent.

10. A process according to claim 1, characterised in that the non-fatty lubricant of the conversion solution is glycerine.

11. A process according to claim 1, characterised in that said conversion solution comprises from 1% to 10%, by volume of glycerine.

12. A process according to claim 1, characterized in that said conversion solution comprises from 1% to 3% by volume of glycerine.

13. A process according to claim 1, characterised in that the alcohol of said conversion solution is ethyl alcohol 95°.

14. A process according to claim 13, characterised in that said conversion solution comprises between 1% and 6%, by volume of ethyl alcohol 95°.

15. A process according to claim 13, characterized in that said conversion solution comprises from 1% to 2% by volume of ethyl alcohol 95%.

16. A process according to claim 1, characterized in that the polymer is expanded polystyrene (EPS).

17. A magma of a polymer, consisting of an expanded styrene polymer or expanded styrene copolymer, characterised in that it may be obtained according to the process of claim 1.

18. A composition comprising:
- a major proportion of a solvent making it possible to modify the physical state of an expanded polymer, consisting of an expanded styrene polymer or expanded styrene copolymer, from an expanded solid state to a non-expanded amorphous state in order to obtain a magma,
- a minor proportion of a non-greasy lubricant consisting of glycerine or a polytetrafluoroethylene in a sufficient amount to give said magma a non-sticky surface state and, if necessary,
- a minor proportion of an alcohol in a sufficient amount to bind said solvent and said lubricant in said composition.

19. A composition according to claim 18, characterised in that it comprises from 94% to 98% of acetone, from 1% to 10% of glycerol and from 1% to 6% by volume of ethyl alcohol 95°.

20. A solid, pasty or liquid composite article comprising a magma according to claim 17.

21. A solid article according to claim 20, characterised in that it also comprises organic solid particles such as particles of wood, natural fibres, artificial fibres, or non-organic solid particles such as particles of metal, glass, clay powder, stone powder or slate powder.

22. A liquid or pasty article according to claim 20, characterised in that it consists of an adhesive, a varnish, a lacquer, a sealant or a paint.

* * * * *